United States Patent [19]

Hashimoto et al.

[11] 4,284,046

[45] Aug. 18, 1981

[54] CONTACTLESS IGNITION SYSTEM FOR INTERNAL COMBUSTION ENGINE

[75] Inventors: Hideyuki Hashimoto, Katsuta; Yoshito Kyogoku, Mito; Hiroshi Katada, Katsuta, all of Japan

[73] Assignee: Hitachi, Ltd., Tokyo, Japan

[21] Appl. No.: 112,746

[22] Filed: Jan. 17, 1980

[30] Foreign Application Priority Data

Jan. 19, 1979 [JP] Japan ................................ 54/3851

[51] Int. Cl.³ .............................................. F02P 5/08
[52] U.S. Cl. ................................. 123/418; 123/416; 123/415
[58] Field of Search ............... 123/414, 418, 417, 427, 123/416, 421, 415

[56] References Cited

U.S. PATENT DOCUMENTS

| 3,418,989 | 12/1968 | Silverman | 123/418 |
|---|---|---|---|
| 3,752,139 | 8/1973 | Asplund | 123/418 |
| 3,874,351 | 4/1975 | Asler et al. | 123/418 |
| 3,885,534 | 5/1975 | Webster | 123/418 |
| 3,939,811 | 2/1976 | Sasayama | 123/416 |
| 4,066,968 | 1/1978 | Guipaud | 123/418 |
| 4,086,894 | 5/1978 | Caparka et al. | 123/418 |
| 4,100,895 | 7/1978 | Haddori et al. | 123/415 |
| 4,106,440 | 8/1978 | Lai et al. | 123/416 |
| 4,164,204 | 8/1979 | Guipaud | 123/418 |

FOREIGN PATENT DOCUMENTS 2252026  6/1975  France ................................ 123/416

Primary Examiner—Charles J. Myhre
Assistant Examiner—R. A. Nelli
Attorney, Agent, or Firm—Craig and Antonelli

[57] ABSTRACT

A contactless ignition system for the internal combustion engine comprises a first integrator for generating a triangular wave voltage $V_1$ which rises at the minimum advance angle position and is held constant at the maximum advance angle position, a second integrator for generating a triangular wave voltage $V_2$ which rises at the maximum advance angle position, a first comparator for generating an output signal in response to the coincidence between the first and second triangular wave voltages $V_1$ and $V_2$, a third integrator for generating a triangular wave voltage $V_3$ which rises in response to an output signal generated from the first comparator, and a second comparator for generating an output signal in response to the coincidence between the first and third triangular wave voltages $V_1$ and $V_3$. An ignition signal is generated by the output of the second comparator. The change rate of the triangular wave voltage $V_2$ is regulated in accordance with the engine operating condition, thus changing the advance angle width.

4 Claims, 14 Drawing Figures

→ TIME

CONTACTLESS IGNITION SYSTEM FOR INTERNAL COMBUSTION ENGINE

BACKGROUND OF THE INVENTION

1. Field of the Invention

The present invention relates to a contactless ignition system for internal combustion engines or more in particular to a contactless ignition system for internal combustion engines which is controlled electronically in accordance with the engine operating conditions including the engine intake negative pressure, intake temperature and throttle opening.

2. Description of the Prior Art

An example of the electronic advancing system for automatically advancing ignition timing in accordance with the engine r.p.m. of an internal combustion engine is disclosed in U.S. Pat. No. 3,885,534 assigned to Webster on May 27, 1975. In this advancing system, during the rotation of the crank of the internal combustion engine by $4\pi/c$ (c: number of cylinders), the input signal is integrated, and when this integrated output coincides with a reference value, an ignition signal is generated. The ignition timing is determined by adjusting the reference value. When the reference value is reduced, for instance, the timing of coincidence between the integrated output and the reference value is advanced, thus advancing the ignition timing.

In the above-mentioned system, the integrated output is always required to correspond to the rotational angle of the crank shaft. In the case where a predetermined input signal is applied to an integrator having a predetermined integration constant, the integration time is shortened with the increase in r.p.m. so that the integrated output is reduced for the same rotational angle of the crank shaft, thus failing to correspond to the rotational angle of the crank shaft. The system disclosed in the U.S. Pat. No. 3,885,534 comprises a feedback system for controlling the input signal to the integrator in accordance with the engine rotational speed thereby to attain coincidence between the integrated output and the rotational angle of the crank shaft. This complicates the system.

According to the U.S. Pat. No. 3,939,811 assigned to Sasayama on Feb. 24, 1976, on the other hand, a capacitor is charged by a constant current during the rotation of the crank shaft by a predetermined angle, followed by discharge of the capacitor by a constant current, and when the capacitor voltage reaches a predetermined level, an ignition signal is generated. In this case, the charge and discharge time of the capacitor is not related to the rotational speed of the crank shaft, thus leading to the advantage that the integrated output always coincides with the rotational angle of the crank shaft without any feedback system.

In the case of an internal combustion engine, especially, an internal combustion engine for the motor bicycles, it is generally required that the advance angle of ignition timing be controlled in accordance with the intake negative pressure, intake air temperature and throttle opening. In the aforementioned system, the width of the advance angle cannot be controlled.

SUMMARY OF THE INVENTION

Accordingly, it is an object of the present invention to provide a contactless ignition system of a simple construction in which ignition timing is capable of being controlled.

Another object of the present invention is to provide a contactless ignition system in which advance angle is controlled automatically in accordance with the operating conditions of the internal combustion engine including the engine intake negative pressure, intake temperature and throttle opening.

DESCRIPTION OF THE PREFERRED EMBODIMENTS

Figure 1:
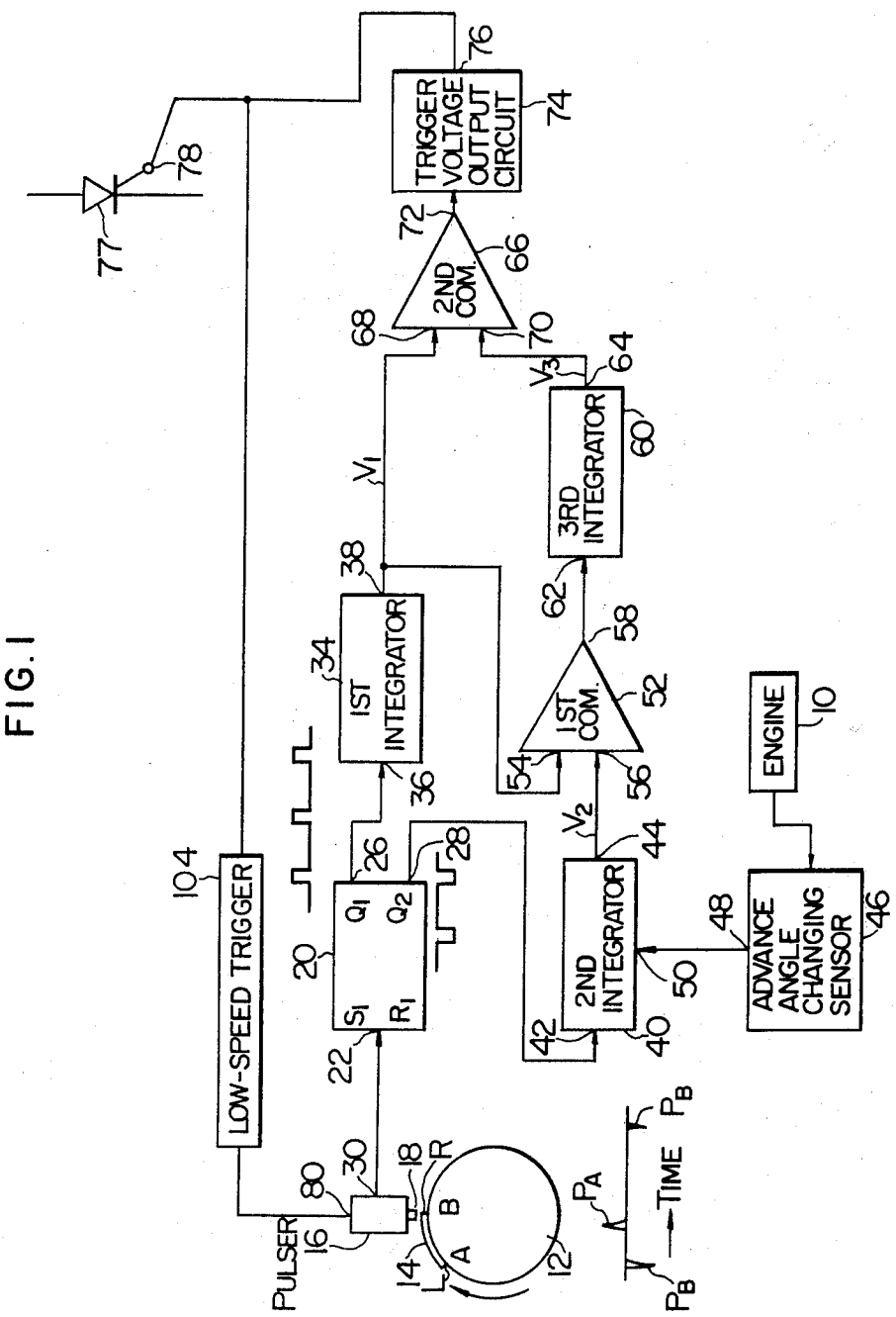
FIG. 1 is a block diagram showing an embodiment of the present invention.
Figure 6A:
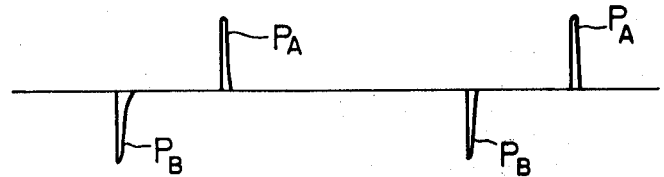
FIGS. 6A to 6I show waveforms produced at various parts included in the circuit of FIG. 5.
Figure 6B:
Figure 6C:
Figure 6D:
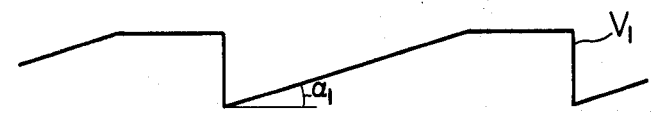
Figure 6E:
Figure 6F:
Figure 6G:
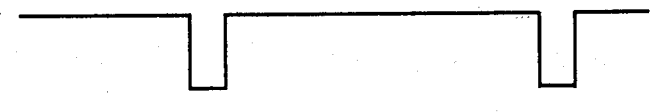
Figure 6H:
Figure 6I:

In FIG. 1, a rotor 12 driven in a predetermined relationship with an engine 10 has a protrusion 14 on the outer periphery thereof, the peripheral width of the protrusion 14 corresponding to the width between minimum and maximum ignition timing advance angles. A pulser 16 generates a positive signal shown $P_A$ (See FIG. 6A) when the end L of the protrusion 14 is opposed to the pickup 18, and a negative pulse signal $P_B$ (See FIG. 6A) when the other end R thereof is opposed to the pickup 18. The advance angle is minimum at the position A where the end L is opposed to the pickup 18, whereas it is maximum at the position B where the other end R is opposed to the pickup 18.

A flip-flop 20 includes an input terminal 22, and output terminals 26 and 28. The input terminal 22 is connected with an output terminal 30 of the pulser 16. A first integrator 34 has an input terminal 36 and an output terminal 38 for producing an output signal $V_1$ as a result of integration of the input signal.

The output terminal 28 of the flip-flop 20 is connected to the input terminal 42 of the second integrator 40. The integrator 40 produces at the output terminal 44 an output signal as a result of integration of the input signal. The output terminal 48 of the advance angle switching sensor 46 responsive to the engine operating conditions such as the intake negative pressure, intake air temperature or throttle opening is connected with the input terminal 50 of the integrator 40. The charging time constant (integration constant) of the integrating capacitor of the integrator 40 is variable in accordance with the engine operating condition.

A comparator 52 includes input terminals 54 and 56 and an output terminal 58. The input terminal 54 is connected to the output terminal 38 of the integrator 34, and the input terminal 56 thereof is connected to the output terminal 44 of the integrator 40. When the input signals to the input terminals 54 and 56 coincide with each other, an output signal is produced at the output terminal 58. A third integrator 60 includes an input terminal 62 and an output terminal 64 and generates an outpt signal $V_3$ as a result of integration of the input signal thereof. A comparator 66 has input terminals 68 and 70 and an output terminal 72 and generates an output signal at the output terminal 72 when the input signals thereto coincide with each other. The input terminal of the trigger voltage generator circuit 74 is connected to the output terminal 72 of the comparator 66. The gate 78 of the thyristor 77 for generating an ignition signal is connected to the output terminal 76 of the voltage generator circuit 74 and the output terminal 80 of the pulser 16. The thyristor 77 is turned on in response to a signal applied to the gate 78 thereof, so that the ignition coil (not shown) is energized thereby to generate a high voltage. This high voltage is applied to the ignition plugs of the engine 10.

When the crank shaft reaches the minimum advance angle position A, the pulser 16 is opposed to the end L of the protrusion 14 as shown, thus generating a positive pulse $P_A$ as an advance angle position signal. This positive pulse is applied to the gate 78 of the thyristor 77, thus supplying a high voltage to the ignition plugs. This positive pulse $P_A$ is also applied to the input terminal 22 of the flip-flop 20 so that the output signal $Q_1$ is produced at the output terminal 26 of the flip-flop 20.

When the crank shaft reaches the maximum advance angle positin B with further rotation, the pulser 16 is opposed to the end R of the protrusion 14 and generates a negative pulse $P_B$ as an advance angle position signal. The condition in which the crank shaft corresponds to the maximum advance angle position B is shown in FIG. 1. This negative pulse $P_B$ is applied to the input terminal 22 of the flip-flop 20 and inverts it. As a result, the output signal $Q_1$ of the flip-flop 20 disappears, and the output signal $Q_2$ is produced at the output terminal 28. In this way, opposite output signals $Q_1$ and $Q_2$ are produced at the output terminals 26 and 28 of the flip-flop 20 as shown in the drawing.

Figure 2:
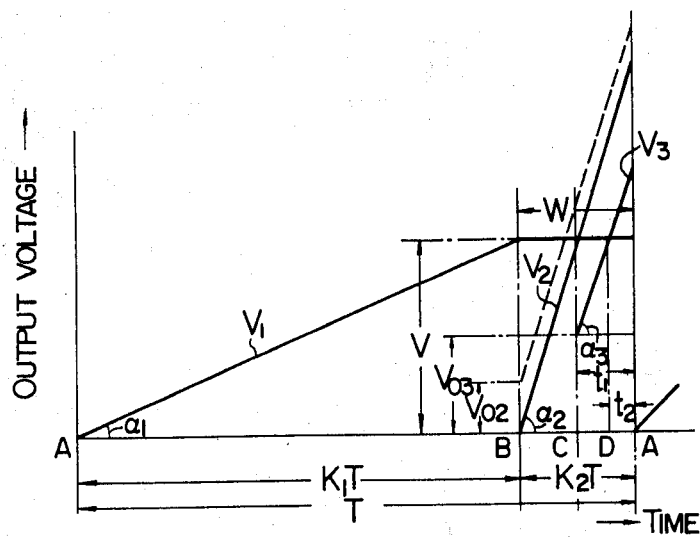
FIG. 2 is a graph for explaining the operating principle of the present invention.

As will be seen from above, a predetermined input signal is applied to the input terminal 36 of the integrator 34 during the rotation of the crank shaft from minimum advance angle position A to maximum advance angle position B, thus generating a triangular voltage signal $V_1$ changing at a predetermined change rate $\alpha_1$ as shown in FIG. 2. After the crank shaft reaches the maximum advance angle position B, the output signal $Q_1$ is not produced from the flip-flop 20, so that the output signal at the output terminal 38 of the integrator 34 is held at a predetermined level.

When the crank shaft reaches the maximum advance angle position B, the integrator 40 begins the integrating operation and produces a triangular signal $V_2$ changing at the change rate $\alpha_2$ as shown in FIG. 2. When the triangular voltage signals $V_1$ and $V_2$ coincide with each other at the crank angle position C, the comparator 52 produces an output signal, so that a predetermined input signal is applied to the integrator 60. As a result, the integrator 60 generates a triangular signal $V_3$ changing at the predetermined change rate $\alpha_3$ and having an initial value of $V_{03}$. When the triangular voltage signals $V_1$ and $V_3$ coincide with each other at the crank angle position D, the comparator 66 produces an output signal, thus generating an ignition signal. When the crank shaft again reaches the minimum advance angle position A, the integrators 34, 40 and 60 are reset. FIG. 2 shows the case in which the ignition timing is advanced by time $t_2$ from the minimum advance angle position A.

In FIG. 2, let the maximum value of the first triangular voltage $V_1$ be V, the rotational period of the crank shaft be T, the advance time associated with the coincidence between the first and second triangular wave voltages $V_1$ and $V_2$ be $t_1$, and the advance timings for the ignition signal be $t_2$. Then the equations below are obtained.

$$V = K_1 T \tan \alpha_1 \quad (1)$$

$$V = (K_2 T - t_1) \tan \alpha_2 \quad (2)$$

where $K_1$ and $K_2$ are constants determined by the maximum advance angle W, and are given in the form shown below.

$$K_1 + K_2 = 1,$$

$$K_2 = W/360°.$$

From equations (1) and (2), $$K_1 T \tan \alpha_1 = (K_2 T - t_1) \tan \alpha_2$$

$$\text{Thus, } t_1 = K_2 T - K_1 T \frac{\tan \alpha_1}{\tan \alpha_2} = K_3 T \quad (3)$$

where $K_3$ is assumed to be $$K_2 - K_1 \frac{\tan \alpha_1}{\tan \alpha_2}.$$

Generally, the advance time t, the revolutional speed N and the advance angle $\theta$ have the relation mentioned below.

$$\theta = 360° \times (t/T) \quad (4)$$

$$T = 60/N \quad (5)$$

Thus the advance time $t_1$ is converted into the advance angle $\theta_1$ as follows.

$$\theta_1 = 360° \left( K_2 - K_1 \frac{\tan \alpha_1}{\tan \alpha_2} \right) = 360° \times K_3 \quad (6)$$

In similar fashion, the advance time $t_2$ and advance angle $\theta_2$ of the ignition signal are given by equations (7) and (8) below.

$$t_2 = \left( K_3 T - K_1 T \frac{\tan \alpha_1}{\tan \alpha_3} \right) + \frac{V_{03}}{\tan \alpha_3} \quad (7)$$

$$\theta_2 = 360° \times \frac{t_2}{T} \quad (8)$$

$$= 360° \left( K_3 - K_1 \frac{\tan \alpha_1}{\tan \alpha_3} \right) + \frac{60 V_o}{\tan \alpha_3} N$$

The equation (8) shows that the advance angle $\theta_2$ changes in proportion to the r.p.m. in the period between the advance angle $\theta_1$ and minimum advance angle $\theta_0$ (advance angle for the minimum advance angle position). The curve Cc in FIG. 3 represents the advance characteristics thereof.

As shown by equation (3), the advance angle $\theta_1$ depends on the change rate $\alpha_2$ of the second triangular wave $V_2$. In the event that the change rate $\alpha_2$ of the second triangular wave $V_2$ is changed as shown in FIG. 4 thereby to adjust the advance angle $\theta_1$ where the first and second triangular wave voltages $V_1$ and $V_2$ coincide with each other, therefore, the advance angle characteristic changes as shown in FIG. 3. In FIG. 4, when the second triangular wave voltage $V_2$ takes the forms of $V_{21}$, $V_{22}$ and $V_{23}$, the advance angle characteristic of FIG. 3 changes to $C_E$, $C_F$ and $C_B$ respectively, resulting in corresponding changes in advance angle width W. When $\alpha_2 = 90$ degrees, the advance angle width is maximum. It is thus possible to control the advance angle width in accordance with the engine operating conditions by changing the change rate $\alpha_2$ of the second triangular wave voltage $V_2$ in accordance with the engine operating conditions such as intake negative pressure, intake air temperature or throttle opening.

Figure 3:
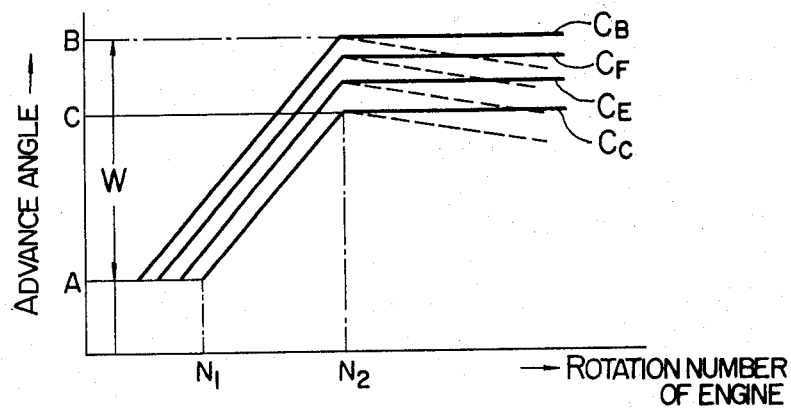
FIG. 3 is a graph showing the change in characteristics of advance angle according to the present invention.
Figure 4:
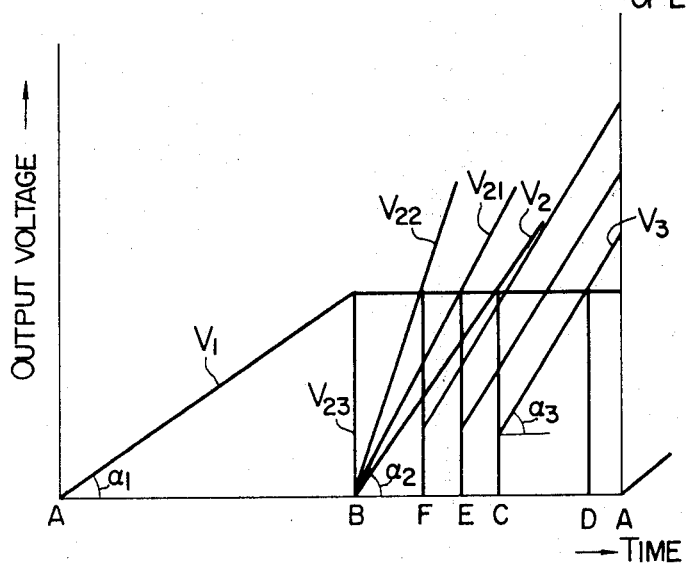
FIG. 4 is a graph showing the manner in which an advance angle is controlled according to the present invention.

When the control circuit is delayed in operation, the advance angle characteristic is such that as shown by the dotted line in FIG. 3, the advance angle is reduced in the area above the revolutional speed $N_2$ where the maximum advance angle is reached. In order to compensate for this delay, the second triangular wave voltage $V_2$ is required to take the initial value $V_{02}$ as shown in FIG. 2.

Figure 5:
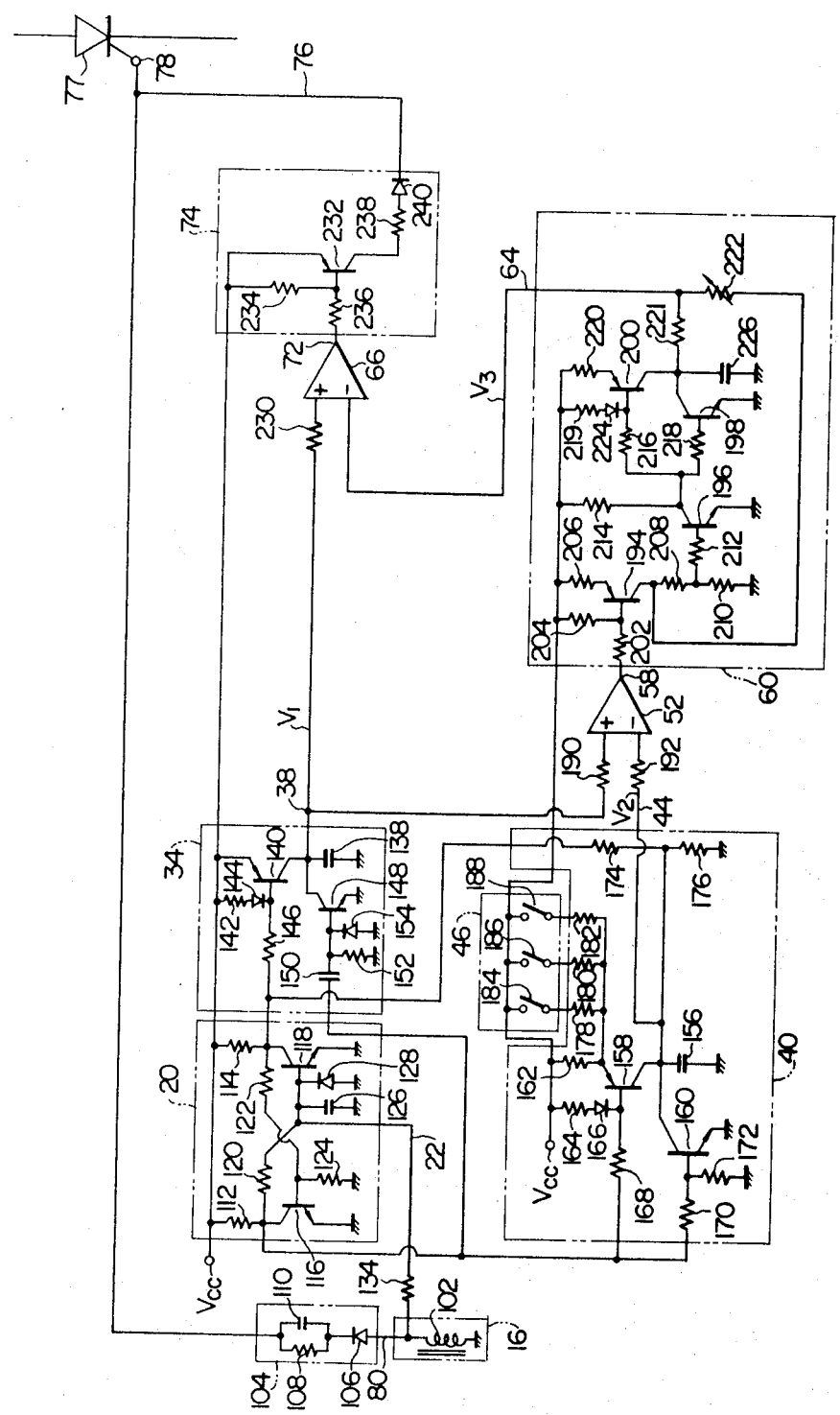
FIG. 5 is a diagram showing a specific circuit of the embodiment shown in FIG. 1.

A specific circuit of an embodiment of the present invention shown in FIG. 1 is illustrated in FIG. 5. The output terminal 80 of the pickup coil 102 making up the pulser 16 is connected to the gate 78 of the thyristor 77 through the low-speed trigger circuit 104. The low-speed trigger circuit 104 is comprised of a forward-connected diode 106, a parallelly-connected resistor 108 and a capacitor 110. The flip-flop 20 comprises a pair of transistors 116 and 118 with the collectors thereof connected to the resistors 112 and 114 respectively, resistors 120 and 122 for feeding back the collector voltages of one of the respective transistors to the other transistor, a resistor 124 inserted between the base of the transistor 116 and the earth, a capacitor 126 inserted between the base of the transistor 118 and the earth, and a diode 128. When the pulser 16 generates a positive pulse $P_A$ at the minimum advance angle position A, a signal is applied to the input terminal 22 of the flip-flop 20 through the resistor 134, so that the transistor 118 is turned on and the transistor 116 is turned off while at the same time applying a signal to the gate 78 of the thyristor 77 through the low-speed trigger circuit 104.

When the pulser 16 generates a negative pulse $P_B$ at the maximum advance angle position B, a signal is applied to the input terminal 22 of the flip-flop 20 through the resistor 134, so that the transistor 116 is turned on and the transistor 118 is turned off. The integrator 34 includes an integrating capacitor 138, a transistor 140 for supplying a constant current to the integrating capacitor 138, a resistor 142 and a diode 144 inserted between the base and emitter of the transistor 140, and a resistor 146 connected to the base circuit of the transistor 140. A transistor 148 is connected in parallel to the integrating capacitor 138. The base of the transistor 148 is connected through the capacitor 150 to the collector of the transistor 116 of the flip-flop 20 on the one hand and grounded through the resistor 152 on the other hand. The diode 154 is connected in reverse direction to the resistor 152. When the flip-flop 20 is set and the transistor 118 is turned on, the transistor 140 is turned on so that the capacitor 138 is charged at a constant current, thus generating an output voltage $V_1$ changing at the rate $\alpha_1$ at the output terminal 38. When the flip-flop 20 is reset, the transistor 140 is turned off and thus the output voltage $V_1$ (capacitor voltage) is held at a predetermined level. When the flip-flop 20 changes from a reset to a set condition, the capacitor 138 discharges by a pulse generated through the capacitor 150 in response to the turning on of the transistor 148.

The second integrator 40 comprises an integrating capacitor 156, a transistor 158 for supplying a constant current to the integrating capacitor 156, and a transistor 160 for discharging the integrating capacitor 156. The emitter of the transistor 158 is connected to a DC power supply through a resistor 162, and the base thereof is connected to the same DC power supply through the resistor 164 and the diode 166. The bases of the transistors 158 and 160 are connected to the collector of the transistor 116 of the flip-flop 20 through resistors 168 and 170 respectively. The resistor 172 is inserted between the base of the transistor 160 and the earth.

When the flip-flop 20 is reset and the transistor 116 is turned on, the transistor 158 is immediately turned on, thus charging the capacitor 156 at a constant current. As a result, a triangular wave voltage $V_2$ changing at the predetermined change rate $\alpha_2$ is generated at the output terminal 44. This capacitor 156 discharges when the flip-flop 20 is reset and the transistor 160 is turned on.

The resistors 174 and 176 are provided for the purpose of applying a bias voltage to the integrating capacitor 156. Since the second triangular wave voltage $V_2$ has the initial value $V_{02}$ by way of this bias voltage, the circuit delay is compensated, thus attaining the horizontal advance angle characteristic as shown by the solid line in FIG. 3.

The advance angle width switching sensor 46 is comprised of resistors 178, 180, 182 included in the charge circuit of the integrating capacitor 156 of the integrator 40 and switches 184, 180, 182 connected in series to the resistors 178, 180, 182 respectively. When the switch 184, 186 or 188 is closed selectively in response to the intake negative pressure or intake air temperature of the engine 10, the charging time constant of the integrating capacitor 156 changes, thus changing the change rate $\alpha_2$ of the second triangular wave voltage signal $V_2$. As a result, the advance angle width is regulated as shown in FIG. 3.

The comparator 52 is connected to the integrating capacitors 138 and 156 through the resistors 190 and 192 respectively.

The third integrator 60 includes transistors 194, 196, 198, 200, resistors 202, 204, 206, 208, 210, 212, 214, 216, 218, 219, 220, 221, 222 a diode 224, and an integrating capacitor 226. When the comparator 52 produces an output, the transistor 194 is turned on, thus turning on the transistor 196. In response to the turning on of the transistor 196, the transistor 200 is turned on, thus supplying a constant current to the capacitor 226. As a result, the triangular wave voltage $V_3$ changing at the rate $\alpha_3$ is produced at the output terminal 64 as shown in FIG. 2. The initial value $V_{03}$ of the triangular wave voltage $V_3$ is determined by adjusting the resistor 222. When the flip-flop 20 is set, the output signal of the comparator 52 disappears and the transistor 194 is turned off. In response to the turning off of the transistor 194, the transistor 198 is turned on while the transistor 200 is turned off. Thus the integrating capacitor 226 is discharged.

The comparator 66 has a resistor 230 and produces an output signal when the output signal $V_1$ of the integrator 34 coincides with the output signal $V_3$ of the integrator 60. The trigger voltage generator circuit 74 includes a transistor 232, resistors 234, 236, 238 and a diode 240.

Waveforms produced at various parts are shown in FIG. 6. The waveform 6A is produced from the pickup coil 102, the waveform 6B is produced at the output terminal 26 of the flip-flop 20, the waveform 6C is produced at the output terminal 28 of the flip-flop 20, the waveform 6D is produced at the output terminal 38 of the first integrator 34, the waveform 6E is produced at the base of the transistor 148 in the first integrator 34, the waveform 6F is produced at the output terminal 44 of the second integrator 40, the waveform 6G is produced at the output terminal 58 of the first comparator 52, the waveform 6H is produced at the output terminal 64 of the third integrator 60, and the waveform 6I is produced at the output terminal 72 of the second comparator 66.

We claim:

1. A contactless ignition system for an internal combustion engine, comprising: position detector means for detecting the minimum advance angle position and the maximum advance angle position where a first advance angle position signal and a second advance angle position signal are generated respectively; first signal generator means for generating a first signal changing at a predetermined change rate in response to the first advance angle position signal of said position detector means, said first signal generator means holding said first signal at a predetermined level in response to the second advance angle position signal of said position detector means; second signal generator means for generating a second signal changing at a predetermined change rate in response to the second advance angle position signal of said position detector means; means for controlling the change rate of said second signal; first comparator means for generating an output signal when said first signal and said second signal coincide with each other; third signal generator means for generating a third signal changing at a predetermined change rate in response to an output signal of said first comparator means, said third signal having a predetermined initial value; and second comparator means for generating an ignition signal when said first signal and said third signal coincide with each other.

2. A contactless ignition system according to claim 1, wherein said means for controlling the change rate regulates the change rate of said second signal in accordance with at least selected one of the engine intake negative pressure, intake air temperature and throttle opening.

3. A contactless ignition system according to claim 1, wherein said second signal generator means includes means for determining the initial value of said second signal.

4. A contactless ignition system comprising: a pickup coil for generation a first pulse and a second pulse at the minimum advance angle position and the maximum advance angle position respectively; a low-speed trigger circuit connected to the output terminal of said pickup coil and responsive only to the first pulse; a flip-flop having an input terminal and first and second output terminals, said input terminal being connected to the output terminal of said pickup coil; a first integrator including an integrating capacitor, the first and second input terminals of said first integrator being connected to the first and second output terminals of said flip-flop respectively, said integrating capacitor being charged at a constant current in response to an input signal applied to said first input terminal, said integrating capacitor being discharged in response to an input signal applied to said second input terminal; a second integrator including an integrating capacitor and an input terminal connected to the second output terminal of said flip-flop, said integrating capacitor being charged in response to an input signal applied to an input terminal thereof and discharged in the absence of an input signal applied to the input terminal thereof; an advance angle width switching sensor connected in series with the integrating capacitor of said second integrator for adjusting the charging time constant; a first comparator including first and second input terminals connected to the output terminal of said first integrator and the output terminal of said second integrator respectively; a third integrator having an input terminal connected to the output terminal of said first comparator, and including an integrating capacitor, a circuit for charging said integrating capacitor at a constant current and a circuit for discharging said integrating capacitor, said integrating capacitor being charged in response to a signal applied to the input terminal thereof and discharged in the absence of a signal applied to the input terminal thereof; a second comparator having first and second input terminals connected to the output terminal of said first integrator and the output terminal of said third integrator respectively, said second comparator generating an output signal when said signals applied to said first and second input terminals coincide with each other; and an ignition pulse generator means connected to the output terminal of said low-speed trigger circuit and said second comparator.

* * * * *